United States Patent
Mori et al.

(10) Patent No.: US 8,992,662 B2
(45) Date of Patent: Mar. 31, 2015

(54) METHOD FOR RECOVERING VALUABLE METALS

(75) Inventors: Kazuhiro Mori, Ehime (JP); Toshirou Tan, Ehime (JP); Jun-ichi Takahashi, Ehime (JP)

(73) Assignee: Sumitomo Metal Mining Co. Ltd., Tokyo (JP)

( * ) Notice: Subject to any disclaimer, the term of this patent is extended or adjusted under 35 U.S.C. 154(b) by 0 days.

(21) Appl. No.: 14/112,230

(22) PCT Filed: Feb. 15, 2012

(86) PCT No.: PCT/JP2012/053475
§ 371 (c)(1),
(2), (4) Date: Jan. 3, 2014

(87) PCT Pub. No.: WO2012/164976
PCT Pub. Date: Dec. 6, 2012

(65) Prior Publication Data
US 2014/0102256 A1 Apr. 17, 2014

(30) Foreign Application Priority Data
Jun. 3, 2011 (JP) .................... 2011-125211

(51) Int. Cl.
*C22B 1/02* (2006.01)
*C22B 1/00* (2006.01)
(Continued)

(52) U.S. Cl.
CPC . *C22B 1/02* (2013.01); *C22B 1/005* (2013.01); *C22B 1/04* (2013.01); *C22B 7/001* (2013.01); *H01M 6/52* (2013.01); *H01M 10/54* (2013.01)
USPC ................ 75/414; 75/571; 75/626; 75/628

(58) Field of Classification Search
CPC .......... C22B 1/02; C22B 7/001; H01M 10/54
USPC ........................................... 75/414
See application file for complete search history.

(56) References Cited

U.S. PATENT DOCUMENTS 6,009,817 A * 1/2000 Hanulik ................. 110/342
7,169,206 B2 1/2007 Cheret et al.
(Continued)

FOREIGN PATENT DOCUMENTS

JP 04-128324 A 4/1992
JP 10-330855 A 12/1996
(Continued)

OTHER PUBLICATIONS

International Search Report of PCT/JP2012/053475.
(Continued)

*Primary Examiner* — George Wyszomierski
*Assistant Examiner* — Tima M McGuthry Banks
(74) *Attorney, Agent, or Firm* — Locke Lord LLP; Jeffrey D. Hsi (57) ABSTRACT

A method for recovering valuable metals is provided in which the degree of oxidation of molten waste batteries is stabilized and separation between slag and an alloy is ensured. The method includes a roasting step (ST10) in which waste batteries are roasted beforehand at a low temperature of 300° C. or higher but lower than 600° C., an oxidation step (ST20) in which the waste batteries are oxidized by roasting at 1,100-1,200° C., and dry step (S20) in which the waste batteries that were oxidized in the oxidation step are melted, and slag and an alloy of valuable metals are separated from each other and recovered. By conducting the roasting step (ST10), organic carbon, which impairs the stability of the oxidation step (ST20) and which is contained, in plastic components, etc., is removed in advance prior to the oxidation step (ST20), and the efficiency of slag/alloy separation can be improved.

10 Claims, 2 Drawing Sheets

(51) Int. Cl.
*C22B 1/04* (2006.01)
*C22B 7/00* (2006.01)
*H01M 6/52* (2006.01)
*H01M 10/54* (2006.01)

(56) References Cited

U.S. PATENT DOCUMENTS

2001/0054331 A1   12/2001   Yasuda et al.
2011/0308353 A1*  12/2011   Hendrickson et al. .......... 75/528

FOREIGN PATENT DOCUMENTS

| JP | 10-060551 A | 3/1998 |
| JP | H10-88250 A | 4/1998 |
| JP | 2000-348782 A | 12/2000 |
| JP | 2010-231925 A | 10/2010 |
| KR | 10-0322038 B1 | 7/2002 |

OTHER PUBLICATIONS

Office Action mailed Jan. 21, 2014 in KR Patent Application No. 10-2013-7025033.
International Search Report of PCT/JP2012/053475 dated May 1, 2012.
Extended European Search Report issued to European Application No. 12792342.3, mailed Apr. 3, 2014.
Office Action dated Mar. 4, 2014 for Chinese Patent Appln. No. 201280017953.8.

* cited by examiner

METHOD FOR RECOVERING VALUABLE METALS

CROSS-REFERENCE TO RELATED APPLICATIONS

This application is the national phase under 35 U.S.C. §371 of PCT International Application No, PCT/JP2012/053475, filed Feb. 15, 2012, which claims the benefit of Japanese Patent Application No. 2011-125211, filed Jun. 3, 2011, the entire contents of the aforementioned applications are hereby incorporated herein by reference.

TECHNICAL FIELD

The present invention relates to a method for recovering valuable metals that are contained in used batteries, for example, waste batteries such as lithium ion batteries.

BACKGROUND ART

Processes for recycling used or in-process defective batteries (hereinafter referred to as "waste batteries"), such as waste lithium-ion batteries, and recovering their valuable metals are broadly divided into dry and wet processes.

A dry process includes melting crashed waste batteries, separating valuable metals, which are to be recovered, from other less valuable metals and materials by harnessing the difference in oxygen affinity between them, and recovering the valuable metals. Specifically, such a dry process includes oxidizing less valuable elements, such as iron, as much as possible to form slag and suppressing the oxidation of valuable materials, such as cobalt, as much as possible to recover the valuable materials in the form of an alloy.

For example, Patent Document 1 discloses a method using a high-temperature heating furnace, in which a flux is added to waste batteries, and slag is repeatedly treated so that valuable metals such as nickel and cobalt can be recovered at a rate of around 80%,

[Patent Document 1] U.S. Patent Application, Publication

DISCLOSURE OF THE INVENTION

Problems to be Solved by the Invention

In regard to treatment processes carried out by a dry method, when waste batteries are oxidized in a melting process, there are many materials to be oxidized, and treatment batches vary widely one from another. Therefore, there is a problem that even if an equal amount of oxygen is added for the purpose of appropriately regulating the degree of oxidation of each of substances that are contained in a melt, it is difficult to obtain an appropriate degree of oxidation for each of the substances similarly on every occasion, and valuable metals cannot be recovered in a stable manner.

More specifically, there is a problem, that among the large number of substances contained in the melt in the melting step, under the influence of various organic carbons such as, for example, plastic components originating from the plastic casings of battery packs, resins such as polyolefin originating from barrier membranes, and organic electrolyte solutions obtained by dissolving lithium salts in organic solvents derived from electrolytes, it is difficult to regulate the degree of oxidation. When large amounts of carbon components contained in batteries are taken into an oxidation process, it is difficult to achieve strict control of oxidation in the melting process, fluctuation is likely to occur in the degree of oxidation, and there are occasions in which the fluctuation interrupts appropriate acceleration of oxidation or suppression of oxidation of other substances in the melt, so that there is a problem that the entirety of the oxidation treatment is made unstable.

The present invention has been made in order to solve the problems described above, and an object of the invention is to provide a method for recovering valuable metals which can stably increase the recovery ratio in the recovery of valuable metals from waste batteries according to a dry method.

Means for Solving the Problems

The inventors of the present invention found that when organic carbons that inhibit reliability of an oxidation step, such as plastic components originating from the plastic casings of battery packs, are eliminated in advance, and thereby carbon components in the melt are reduced, by providing, prior to the valuable metal recovery process, a pretreatment step involving roasting waste batteries in advance at a relatively low temperature in a predetermined range, valuable metals can be recovered more efficiently than in conventional processes. Thus, the inventors completed the present invention. Specifically, the present invention provides the following.

(1) A method for recovering valuable metals from waste batteries, the method including a roasting step involving roasting the waste batteries at a temperature higher than or equal to 300° C. and lower than 600° C.; an oxidation step performing an oxidation treatment by roasting the roasted waste batteries at a temperature of from 1100° C. to 1200° C.; and dry step including of melting the waste batteries after the oxidation step, and. separating and. collecting slag and an alloy of valuable metals.

(2) The method for recovering valuable metals according to item (1), further including; in the melting step in the dry step, an additional oxidation step performing an additional oxidation treatment.

(3) The method for recovering valuable metals according to item (1) or (2), wherein the roasting step and the oxidation step are carried out in a single heating furnace by sequentially changing the temperature inside the single heating furnace.

(4) The method for recovering valuable metals according to item (1) or (2), wherein the roasting step and the oxidation step are carried out in a single heating furnace by dividing the interior of the single heating furnace into plural zones, and heating the respective zones to different temperatures.

(5) The method for recovering valuable metals according to any one of items (1) to (4), wherein the waste batteries are a battery pack equipped with a plastic casing.

Effects of The Invention

According to the present invention, when a process of roasting waste batteries at a temperature in a predetermined range is provided prior to a treatment for recovering valuable metals from waste batteries, valuable metals can be recovered safely at a lower cost than the conventional methods, while maintaining a stable recovery ratio.

EXPLANATION OF REFERENCE NUMERALS

ST10 Roasting step
ST20 Oxidation step
S20 Dry step
ST21 Melting step
ST22 Slag separation
ST23 Alloy separation
ST24 Exhaust gas treatment
ST25 Phosphor removal step
ST26 Alloy shot-forming step
S30 Wet step
ST31 Melting step
ST32 Element separation step
1 Kiln
10 Kiln main body
11 Driving gear
12 Burner pipe
13 Receiving port
14 Discharge port

PREFERRED MODE FOR CARRYING OUT THE INVENTION

Figure 1:
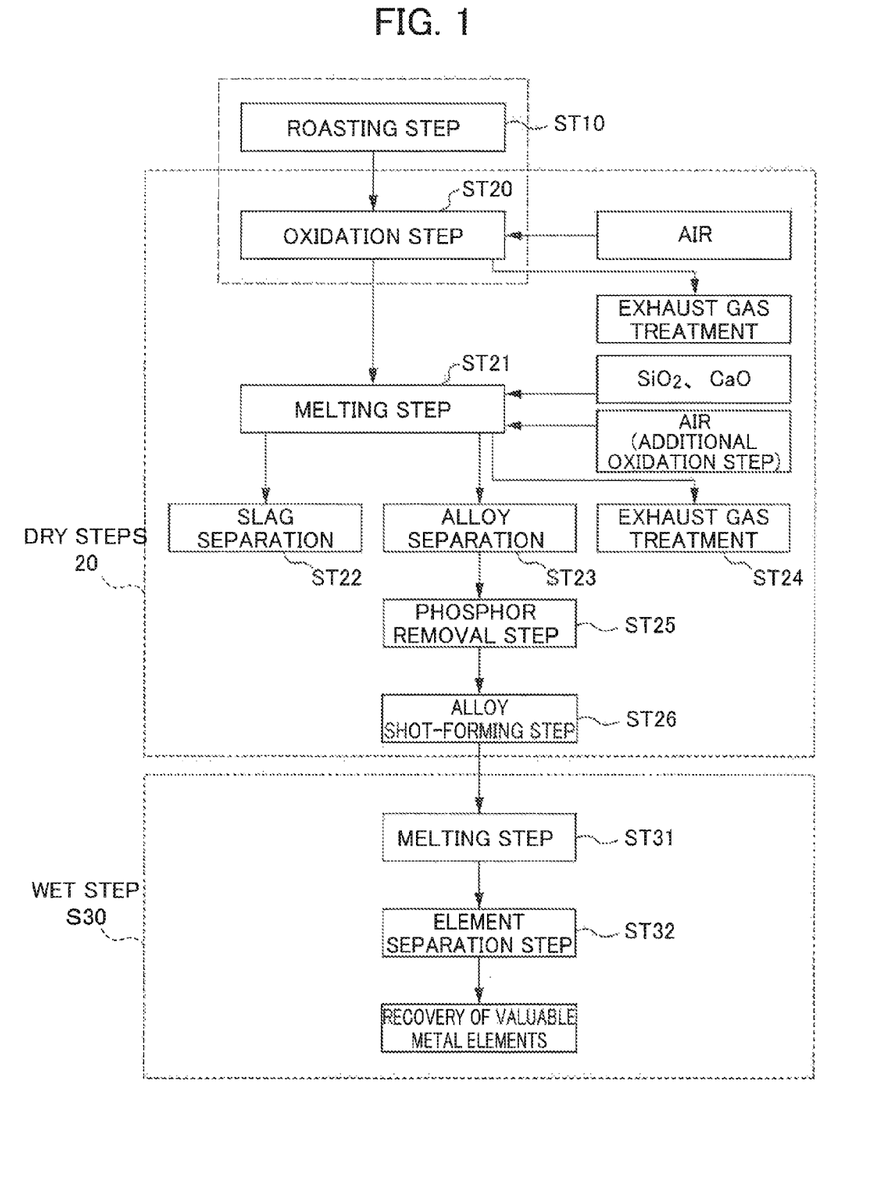
FIG. 1 is a flow chart illustrating a method for recovering valuable metals from waste batteries according to an example of the present invention.

Hereinafter, an embodiment of the present invention will be described with reference to the drawings. FIG. 1 is a flow chart illustrating an example of the method for recovering valuable metals from waste batteries. In the present embodiment, the case in which the waste batteries are a lithium ion battery pack equipped with a plastic casing will be described, but the present invention is not intended to be limited thereto.
Whole Process As can be seen from FIG. 1, this method, for recovering valuable metals includes a roasting step ST10, an oxidation step ST20, dry step S20, and wet step S30. As such, the method for recovering valuable metals according to this Example is a total process in which an alloy is obtained in the dry step S20, and then valuable metal elements are separately collected by the wet step S30. Meanwhile, the waste batteries as used in the present invention means to include not only used batteries, but also defective products produced during the processes. Furthermore, it is preferable that the object of treatment includes waste batteries, and the appropriate addition of other metals, resins or the like in addition to waste batteries is not intended to be excluded. In that case, the waste batteries of the present invention are meant to include other metals or resins.
Roasting Step ST10

First, the roasting step ST10, which is a feature of the present invention, will be explained. The roasting step ST10 is a pretreatment step that, is carried out prior to other various steps in the method for recovering valuable metals, and is a process of decreasing the organic carbons that are contained in plastic casings and the like, by roasting waste batteries at a temperature of 300° C. to 600° C. Therefore, from the viewpoint that it is difficult for carbides to remain, the roasting is preferably oxidizing roasting using air or a gas containing oxygen. However, roasting in a reducing atmosphere such as a nitrogen atmosphere is not intended to be excluded. Furthermore, the roasting time is not particularly limited, but it is preferable to adjust the proportion of carbon originating from organic materials obtained after the roasting step ST10 to 10% by weight or less with respect to the carbon originating from organic materials before the roasting step ST10. Thereby, fluctuations in the degree of oxidation in the subsequent oxidation step can be suppressed. Meanwhile, the term carbon originating from organic materials as used herein includes, among all the organic carbon components contained in waste batteries, plastic components originating from the plastic casings of battery packs, resins such as polyolefin originating from barrier membranes, organic electrolyte solutions obtained by dissolving lithium salts in organic solvents that originate from electrolytes, and the like; however, carbon as an anode active material of batteries is not included. Hereinafter, when the term carbon originating from organic materials is used in the present specification, it is intended to mean the carbon components described above.

Furthermore, a portion of organic carbon that is not combusted by thermal decomposition remains as carbides, but most of these can be easily removed by being physically detached from waste batteries. Furthermore, the trace amount of carbon remaining adhered to the main body of batteries does not inhibit appropriate adjustment of the degree of oxidation in the oxidation step, and can be separated in the subsequent separation step. Meanwhile, since the temperature of this roasting step ST10 is a lower temperature as compared with the subsequent oxidation step, metals are not oxidized, and the subsequent oxidation seep is hardly affected.

When the roasting temperature in the roasting step ST10 is set to below 300° C., the roasting temperature does not reach the thermal decomposition temperature of conventional olefin resins, vinyl chloride resins and the like. Therefore, plastic components and the like having a melting point of about 250° C. are brought in to the oxidation step ST20 in a molten state, Particularly in the case of a lithium ion battery pack equipped with a plastic casing, there are large fluctuations in the components in and weight of different battery pack products, as compared with the fluctuations in the battery main foodies. When the carbon fraction included in the battery packs are brought into the oxidation step, there are large fluctuations in the oxidation conditions required for the oxidation step, and the control of the degree of oxidation becomes difficult. Furthermore, there are occasions in which a portion of molten plastics adhere to the inside of the furnace where roasting is carried out, causing interruption of smooth operation, or causing deterioration of the roasting furnace itself, which is not preferable. Accordingly, it is preferable that the roasting temperature in the roasting step ST10 is 300° C. or higher, which is required for the thermal decomposition of plastic components.

On the other hand, when the roasting temperature is higher than 600° C., the reaction temperature is rapidly increased by the heat of combustion of plastics and the like. Thereby, for example, aluminum foil, which is a battery constituent material and has a melting point of about 660° C., melts and is transformed into a lump of metal. Therefore, the reaction efficiency in the subsequent oxidation step is affected and lowered, and appropriate control of oxidation is made difficult. Furthermore, batteries rupture as a result of an increase in the pressure inside the batteries caused by rapid gasification of the liquid organic materials inside the batteries, such as an organic electrolyte solution that constitutes the electrolyte, and there is a high risk that blowout of the battery contents occurs, and the metals become irrecoverable. Therefore, the roasting temperature in the roasting step ST10 is preferably 600° C. or lower.

As such, when the roasting step ST10 is carried out prior to the oxidation step ST20, at a roasting temperature in a limited low temperature range, that is, in the range of 300° C. to 600°

C., organic carbon originating from the plastic casings and the like of the external packaging can be efficiently removed, while various risks caused by high temperature heating of other components in the waste batteries can be avoided. In addition, the fact that among the carbon components contained in waste batteries, the removal of the plastics originating from battery packs in particular is effective for strict control of the degree of oxidation, and is as described above; however, the carbon components that are eliminated by the roasting step are not necessarily limited to these. The polymer barrier membrane which is a constituent element of a battery, and the like can also be eliminated in the roasting step of the present invention. A method for recovering valuable metals, which includes a roasting step intended to carry out such a treatment, is also included in the scope of the present invention.

Furthermore, as the roasting step ST10 is at a roasting temperature in the range of 300° C. to 600° C., organic electrolyte solutions that constitute the electrolyte and the like can undergo mild thermal decomposition. Also, explosion of waste batteries due to rapid expansion of liquids can be prevented, or even if explosion has occurred, the rupture occurs only to a small extent, and the risk that blowout of the contents occurs and metals become irrecoverable can be reduced. Thereby, special pretreatments such as perforation prior to the overall process become unnecessary, and productivity is increased.

This roasting step ST10 can use any heating furnace which is capable of roasting waste batteries in the temperature range described above, without any limitations. For instance, kilns can be used. Among others, rotary kilns that have been conventionally used in cement production or the like can be suitably used. Therefore, below, the details of the embodiment of the present invention will be described by taking a rotary kiln as a representative example of a kiln, but the kiln according to the present invention is not limited thereto. For example, ail types of kilns capable of roasting waste batteries in the roasting step ST10 at a predetermined temperature, such as a tunnel kiln (Haas furnace), are included.

Figure 2:
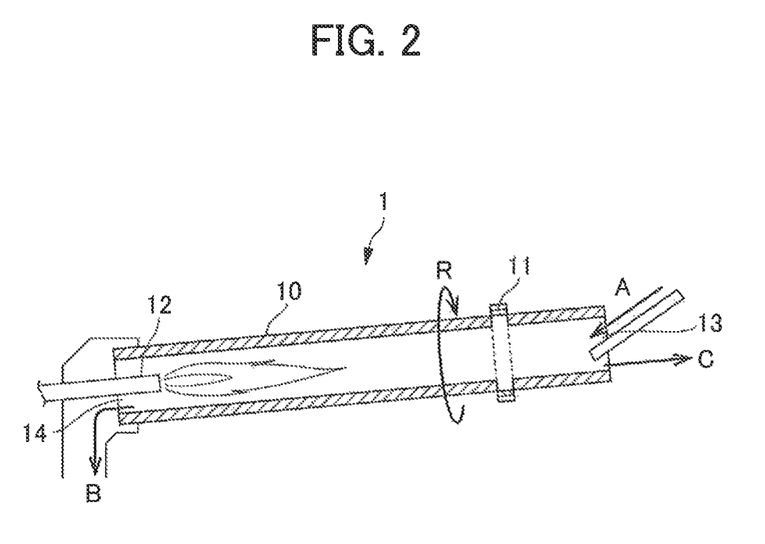
FIG. 2 is a schematic cross-sectional diagram. illustrating the state of use of the kiln used for the oxidation treatment in the preliminary oxidation step of the present invention.

In the present embodiment, the roasting step ST10 is carried out using a kiln 1 illustrated in FIG. 2 as a roasting furnace. As illustrated in FIG. 2, the kiln main body 10 is a cylindrical, rotary-type kiln made of carbon steel or the like having a thickness of 15 mm to 30 mm. The interior is lined with refractory bricks. The kiln main body 10 is furnished on the external side with a driving gear 11 that transfers torque to the kiln main body. Furthermore, the kiln main body is equipped in the inside with a burner pipe 12 that sends hot air for heating the inside. The kiln main body 10 including these is installed so as to have an inclination of 3% to 4% with respect to the horizontal plane at the time of use.

In the roasting step ST10 using the kiln 1, first, the kiln main body 10 is heated such that the internal temperature is 300° C. to 600° C., by means of the not air sent from the burner pipe 12. Next, while the kiln main body 10 is rotated in the R direction by the driving gear 11, waste batteries are brought in from a receiving port 13 in the direction A. Waste batteries move inside the kiln main body 10, while being stirred and roasted along the inclination, toward the direction of the discharge port 14.

Waste batteries that have passed through the course are discharged through the discharge port 14 in the direction B. Up to this time point, the plastics and the like described above mostly vaporize as a result of thermal decomposition, and the remaining portion includes carbides. These carbides are also mostly physically detached from waste batteries as a result of rotational vibration in the kiln, and are removed.

Meanwhile, as will be described in more detail below, the roasting step ST10 and the subsequent oxidation step ST20 can be carried out continuously in the same furnace, and in that case, after completion of the roasting step ST10, the waste batteries are not discharged from the kiln 1 and are uninterruptedly subjected to the oxidation step ST20 in the kiln 1.

Oxidation Step ST20

In the oxidation step ST20, an oxidation treatment is carried out by supplying oxygen while roasting the waste batteries that have been subjected to the roasting treatment in the roasting step ST10, at a temperature of from 1100° C. to 1200° C. In a conventional method for recovering valuable metals, the oxidation treatment is carried out within a melting step in the dry step however, the method for recovery of valuable metals of the present invention is characterized in that the oxidation step ST20 is provided before the melting step ST21, and an oxidation treatment is carried out in advance.

This oxidation treatment is to be carried out in the stage before the melting step ST21 is carried out in the dry step S20, and an oxidizing furnace is provided separately from a melting furnace in which the melting step ST21 is carried out so that the oxidation treatment is carried out in this oxidizing furnace. In the weight proportions of the constituent materials of a lithium ion battery, iron occupies about 20%, cobalt occupies about 20%, carbon occupies 25%, and aluminum occupies about 5%. In the oxidation step, the relatively small amount of carbon remaining in the waste batteries after a certain amount has been eliminated in the roasting step ST10 is completely oxidized and burnt, and also, the oxidation treatment is carried out by regarding an oxidation state which corresponds to a state in which the entire amount of aluminum and about 70% of iron are oxidized, as the optimum degree of oxidation. When oxidation proceeds to a point at which the entire amount of iron is oxidized, when the batteries after oxidation are melted at about 1500° C., the amount of rare metals to be recovered, such as cobalt, distributed in the slag increases, and the recovery ratio decreases, which is not preferable. On the other band, if the degree of oxidation of iron is small, the iron that is to be actually distributed on the slag side in the alloy that is recovered after melting remains in a large amount, which is not preferable.

When the roasting temperature in the oxidation step ST20 is set to be lower than 1100° C., the oxidation treatment time required to obtain the optimum degree of oxidation is increased, which is not preferable. For example, when the oxidation treatment is carried out in a pure oxygen atmosphere at a temperature slightly higher than 1100° C., the required oxidation treatment is completed in about one hour; however, when the oxidation treatment is carried out in the same atmosphere at 900° C., an oxidation treatment time of 4 hours or longer is required. On the other hand, when the temperature inside the kiln main body 10 is higher than 1200° C., even the copper foil, which is a battery constituent material, completely melts and adheres to the inner walls of the kiln main body 10, and this may lead to interruption of smooth operation or deterioration of the kiln itself, which is not preferable. Therefore, the roasting temperature in the oxidation step ST20 is preferably from 1100° C. to 1200° C.

In addition, the oxidation treatment time in the oxidation step is such that from a qualitative viewpoint, as the oxygen concentration is higher and the oxidation temperature is higher, the time required to obtain the optimum degree of oxidation is shortened. For example, when an oxidation time of about one hour is considered, a temperature of 1100° C. or higher is required in a 100% oxygen atmosphere, and a temperature of approximately 1200° C. is required in an air atmosphere. Since the target oxidation time may vary depending on the amount of capital investment allowed, the required throughput or the like, the oxygen concentration in the atmosphere and the oxidation temperature may be controlled in accordance therewith.

This oxidation step ST20 can use, without any particular limitations, a heating furnace capable of carrying out an oxidation treatment in the inside thereof by supplying oxygen while roasting waste batteries in the temperature range described above; however, kilns represented by the rotary kiln described above can be suitably used.

In the present embodiment, the oxidation step ST20 is carried out using the kiln 1 illustrated in FIG. 2 as the oxidizing furnace.

In the oxidation step ST20 using the kiln 1, first, the kiln main body 10 is heated by the hot air sent from the burner pipe 12 so that the internal temperature is 1100° C. to 1200° C. Next, waste batteries are brought in from the receiving port 13 in the direction A while the kiln main body 10 is rotated in the R direction by means of the driving gear 11. Waste batteries move inside the kiln main body 10, while being stirred and roasted along the inclination, toward the direction of the discharge port 14.

With regard to the waste batteries that move inside the kiln main body 10 while being roasted at the above-described temperature, in order to increase the recovery ratios of nickel, cobalt and copper by adjusting the degree of oxidation, an oxidizing agent such as air is introduced into the kiln main body 10. For example, aluminum foil is used in the cathode material for lithium ion batteries. Furthermore, carbon is used as the anode material. Also, the external shell of the battery is made of iron or aluminum. These materials basically act as reducing agents. Therefore, the totalized reaction of gasifying these materials or converting these materials into slag is an oxidation reaction. Accordingly, introduction of oxygen into the kiln main body 10 is needed. This is the reason why air is introduced into the oxidation step ST20.

Although the oxidizing agent is not restricted, air, pure oxygen, oxygen-rich gas, or any other oxygen-containing gas is preferably used because it is easy to handle. In the pre-oxidation step ST20, the gas is directly supplied into the kiln main body 10. As a guide, the amount of the oxidizing agent to be introduced should be about 1.2 times the chemical equivalent required to oxidize each material to be subjected to the oxidation treatment.

The waste batteries oxidized through this process are discharged in the direction B from the outlet 14. The exhaust gas generated in the process of the oxidation treatment is discharged in the direction C.

Main elements that constitute the materials of waste batteries are generally oxidized in the order aluminum>lithium>carbon>manganese>phosphorus>iron>cobalt>nickel>copper, based on the difference in the affinity with oxygen. That is, aluminum is most easily oxidized, and copper is most difficult to oxidise. In order to increase the recovery ratios of cobalt, nickel and copper which have relatively low affinity with oxygen, in the oxidation step ST20, strict adjustment of the degree of oxidation by which the degree of oxidation of iron is increased while oxidation of cobalt is simultaneously suppressed, is required for iron and cobalt having affinities with oxygen that are close to each other.

Since the oxidation step ST20 according to the present invention is an oxidation treatment at a lower temperature as compared with the case of carrying our an oxidation treatment during the melting step ST21, the reaction rate is relatively moderate. Furthermore, since the process is a method of oxidizing waste batteries that move inside the kiln main body 10 by introducing a predetermined amount of oxygen into the space of the cylindrical-shaped kiln main body 10, control of oxidation can be easily achieved by regulating the amount of oxygen, oxidation time and temperature and the like. Even for carbon that greatly inhibits the overall stability of the oxidation treatment, since the oxidation step is in a state that plastic components have been removed to a certain amount in the preceding roasting step ST10, control of oxidation can be easily carried out unlike the case of carrying out the oxidation treatment during the melting step in the dry step. Specifically, in this oxidation step ST20, the oxidation treatment is carried out to the extent that almost the entire amount of residual carbon is oxidized. Thereby, fluctuations caused by non-oxidation of carbon in the melting step ST21 of the next step can be suppressed, and the degree of oxidation of iron or cobalt can be more strictly regulated.

Furthermore, in the oxidation treatment of molten waste batteries in the dry step, oxygen bubbling performed by inserting a straw-shaped cylinder called a lance, which is made of an iron-based material, has been an inexpensive general method; however, since the melting temperature is a high temperature exceeding 1400° C., the rate of consumption by melting of the lance is high. Therefore, the frequency of exchange is high, and there have been problems, such as deterioration of the operation efficiency and an increase in the lance cost. Since this oxidation step ST20 involves roasting, it is also advantageous that there is no problem of lance consumption.

As described above, by carrying out the roasting step ST10 and the oxidation step ST20 prior to the melting step ST21, more strict adjustment of the degree of oxidation can be achieved as compared with, the case of carrying out the oxidation treatment during the melting step ST21. It is a feature of the present invention that the recovery ratio of valuable metals from waste batteries can be thereby increased in a stable manner.

Other Embodiments of Roasting Step and Oxidation Step

In the embodiment described above, the roasting step ST10 and the oxidation step ST20 provide the above-described effects by carrying out the processes in sequence in separate furnaces provided for the respective processes; however, the two steps can also be carried out continuously in a single furnace. For example, the roasting step ST10 and the oxidation step ST20 can be carried out continuously in a single heating furnace by providing a temperature zone of 300° C. to 600° C. and a temperature zone of 1100° C. to 1200° C., respectively (not illustrated in the diagram), in the same heating furnace, such as a kiln.

Alternately, the two steps can also be continuously carried out as batch treatments in a single heating furnace, by heating the inside of a heating furnace, such as a kiln, to 300° C. to 600° C. to carry out the roasting step ST10, and subsequently raising the temperature by heating the inside of the furnace to 1100° C. to 1200° C. to carry out the oxidation step ST20.

Furthermore, as such, even in the case of continuously carrying out the roasting step ST10 and the oxidation step ST20 in a single heating furnace, since the roasting step ST10 is carried out as oxidizing roasting, which is preferable as describe above, there is no need for a significant switching of the atmosphere such as from a reducing atmosphere to an oxidizing atmosphere, and thereby continuous operation can be carried out efficiently. This is also an excellent aspect of the present invention.

As such, since the roasting step ST10 and the oxidation step ST20 are carried out continuously in a single heating furnace, while the recovery ratio of valuable metals is maintained at a level similar to the case of carrying out the steps sequentially in separate furnaces, the cost can be reduced by reducing facilities or processes.

Dry Step S20

In the dry step S20, a melting step ST21 is performed involving melting waste batteries that have been subjected to an oxidation treatment in the oxidation step ST20, at near 1500° C. The melting step ST21 can be carried out in a conventionally known electric furnace or the like.

In regard to the method for recovering valuable metals of the present invention, since the oxidation treatment is carried out in advance in the oxidation step ST20, it is not necessary to carry out the oxidation treatment on molten waste batteries in the dry step as in conventional cases.

However, in the case where oxidation in the oxidation step ST20 is insufficient, or in the case where adjustment of the degree of oxidation is needed, an additional oxidation step involving carrying out an additional oxidation treatment for a very short time can be provided in the melting step ST21. This additional oxidation step enables more fine and appropriate control of the degree of oxidation. Furthermore, since an additional oxidation step can be carried out in a very small time, as compared with the conventional oxidation treatment, at the time of melting, there is less adverse effect on the operation efficiency, and there is less consumption of lances, which hardly brings about a problem of cost increase.

In addition to that, in the melting step ST21, to obtain a decrease in the melting point of the slag that is separated in the slag separation step ST22 as will be described below, $SiO_2$ (silicon dioxide), CaO (lime) and the like are added as fluxes. Meanwhile, it is not necessarily required that this addition of fluxes must be carried, out in the melting step ST21. The same effects can be obtained even if one addition of fluxes is carried out in the oxidation step ST20, which comes before the melting step ST21.

The melting step ST21 produces an alloy of valuable metals, such as nickel, cobalt, and copper, and also produces slag, which is an oxide of iron, aluminium, and the like. Both products, which have different specific gravities, are recovered in slag separation ST22 and alloy separation ST23, respectively. In this process, if the content of aluminium oxide in the slag is relatively high, the slag can have relatively high melting point and high, viscosity. As mentioned above, however, in the melting step ST21, $SiO_2$ and CaO are added to lower the melting point of the slag, so that the slag with a lower melting point can have lower viscosity. Thus, the slag separation ST22 can be efficiently performed. Dust, exhaust gas, and other exhaust products in the melting step ST21 are processed to be harmless in a conventionally known exhaust gas treatment step ST24.

After alloy separation ST23 is performed, the resulting alloy is further subjected to a dephosphorylation step ST25. In lithium-ion batteries, ethylene carbonate, diethyl carbonate, or other organic solvents are used, and $LiPF_6$ (lithium hexafluorophosphate) or other electrolytes are used. The phosphorus in $LiPF_6$ tends to be relatively easily oxidized, but also tends to have a relatively high affinity for iron group elements such as iron, cobalt, and nickel. Phosphorus in the alloy is difficult to remove by the wet step, which is a later step for recovering each element in the form of metal from the alloy obtained in the dry process, and phosphorus is also accumulated as an impurity in the treatment system, which makes it difficult to continue the process. Thus, phosphorus is removed in the dephosphorylation step ST25.

More specifically, lime or other materials capable of reacting to produce CaO are added, and oxygen-containing gas such as air is blown in so that phosphorus in the alloy can be oxidized and absorbed into the CaO.

When the waste batteries are lithium-ion batteries, the alloy obtained in this manner contains, as main components, cobalt or nickel derived from the cathode materials, lithium derived from, electrolytes, and copper derived from the anode materials, etc.

Alloy Shot-Forming Step S26

In this embodiment, the alloy is cooled and obtained in the form of grains (also referred to as "shot-shaped alloy" or simply "shots") at the end of the dry step S20. This makes it possible to perform a dissolution step ST31 in a short period of time in the later wet step S30.

As described below, when the dry step is performed as a pretreatment in a wide sense, an alloy with fewer impurities can be obtained, and the amount of the material to be introduced into and treated in the wet step can be significantly reduced, so that a combination, of the dry step and the wet step can work effectively. However, the wet step is a complicated process and basically unsuitable for high-throughput procedures. Thus, to use the wet step in combination with the dry step, the processing time of the wet step needs to be short, and in particular, the dissolution step ST31 needs to be performed in a short period of time. This problem can be solved by forming the alloy into grains so that the dissolution time can be reduced.

In this step, the grain preferably has an average surface area in the range of 1 $mm^2$ to 300 $mm^2$ and an average weight in the range of 0.4 mg to 2.2 g. If the surface area or the weight is less than the lower limit of the range, a problem may occur in which the particles are too small and thus difficult to handle and a reaction occurs too rapidly so that it will be difficult to dissolve the particles at a time due to too much heat generation, which is not preferred. If the surface area or the weight is more than the upper limit of the range, the rate of dissolution in the later wet step can undesirably decrease. The alloy can be made in the form of shots or formed into grains using a conventionally known method of pouring the molten metal into running water to rapidly cool it.

Wet Step S30

In a process of recovering valuable metals from waste batteries, the alloy recovered as described in Patent Document 1 is not valuable, and thus valuable metal elements must be recovered. When waste batteries are pretreated by the dry step so that an alloy of only valuable metals is obtained as described above, the later wet step can be simplified. In this case, the throughput of the wet step can be reduced to about ¼ to ⅓ (weight ratio) of the amount of the input waste batteries. This also makes the use of the wet step in combination advantageous.

Using the dry step as a pretreatment in a wide sense as described above makes it possible to obtain an alloy with fewer impurities and to significantly reduce the throughput. Thus, the invention makes possible a combination of the dry step and the wet step on an industrial scale.

The wet step is not restricted and may be performed using a conventionally known method. An example of the wet step is as follows. When the waste batteries are lithium-ion batteries and specifically when an alloy of cobalt, nickel, copper, and iron is produced, the alloy is subjected to dissolution with acid (the dissolution step ST31), and then an element separation step ST32 is performed, in which deironization, separation and recovery of copper, nickel/cobalt separation, recovery of nickel, and recovery of cobalt are conducted in this order, so that valuable metal elements are successfully recovered.

Throughput

Conventionally, in regard to a total process combining dry step and wet step, since the oxidation treatment is carried out while waste batteries are in a molten state in the dry step, in order to appropriately regulating the degree of oxidation in the oxidation treatment, the melting step in the dry step needs to be carried out as a batch treatment in which the oxidation treatment of all the waste batteries that are treated simultaneously in the furnace is completed, and then the next step is initiated again from the beginning. According to the method for recovering valuable metals of the present invention, since waste batteries can be continuously treated in the dry step by continuously feeding waste batteries into a melting furnace that have been subjected to the oxidation treatment in advance in the oxidation step ST20, it has been possible to perform the treatment at large throughputs more than in conventional processes. When the throughput is at least 1 t per day, and preferably 10 t per day, the present invention can be suitably used.

The waste batteries may be of any type. Preferred examples of the object to be processed according the invention are lithium-ion batteries, from which rare metals such as cobalt and nickel can be recovered, and whose applications expand to include automobile batteries and others, so that large-scale recovery processes will be necessary for them.

EXAMPLES

Hereinafter, the invention will be more specifically described with reference to examples and comparative examples. It will be understood that the examples described below are not intended to limit the invention.

First, an Example will be described. In the Examples, a roasting step and an oxidation step were provided prior to a melting step, and thereafter, a melting step was provided to perform a melting treatment.

Sample: A battery pack (18650 type) having dimensions of a width of 10 cm, a length of 20 cm and a thickness of 2 cm, and a weight of 300 g in which six lithium ion cells each having a size of 18 mm in diameter and 65 mm in length are housed. The carbon amount of total carbon in this battery pack was about 100 g (carbon as an anode active material: 56 g, and carbon originating from other organic materials: 44 g).

Roasting step: The sample was fed into a vertical furnace that had been heated to 500° C., and was roasted for 30 minutes. After the roasting process for 30 minutes, the waste batteries after being roasted and the fired battery pack were taken out, and these were arranged on a magnesia plate. The carbon amount of total carbon in these was about 60 g (carbon as an anode active material: 56 g, and carbon originating from other organic materials: 4 g), and the total carbon amount decreased to 60% of the initial value (regarding the carbon originating from other organic materials, the amount decreased to 9.1% of the initial value).

Oxidation step: The magnesia plate was taken into the vertical furnace again, and was heated at 1200° C. in a nitrogen atmosphere. Thereafter, an oxidation treatment was carried out by maintaining the batteries for one hour in a state in which air was blown in from, the upper direction of the batteries at a rate of 2 l/min. After one hour, input of air was stopped, the atmosphere was sufficiently aerated with nitrogen to ensure cooling in a nitrogen atmosphere, and then the magnesia plate was taken out from the vertical furnace.

Melting step: after the oxidation step, 45 g of reagent CaO and 45 g of reagent $SiO_2$ were added to the sample, and the mixture was heated to 1500° C. in a nitrogen atmosphere. In the melting step, even without any additional oxidation step provided, the content completely melted.

Alloy separation and slag separation: Slag and an alloy were separately collected after cooling, and the distribution ratio (mass %) of metallic iron and metallic cobalt in the alloy analyzed by an ICP method was measured. With respect to the input, weight, 30% of Fe and 95% of Co were recovered as alloy. Furthermore, the slag after the test of the Example was uniformly molten, and no residual carbon was recognized on the surface.

Meanwhile, it was confirmed that when the time for the oxidation treatment in the oxidation step was set to 1.5 hours or 2 hours, the amounts of elements that are not intended for recovery in the alloy decreased. Specifically, the alloy composition obtainable when oxidation was carried out for 1 hour and then the batteries were melted, was 36% of Fe and 0.08% of F by weight %, while the alloy composition obtainable when oxidation was carried out for 2 hours and then the batteries were melted, was 3.2% of Fe and P<0.01% by weight %.

Next, Comparative Examples will be described. In Comparative Example 1, the same roasting step as in Example was carried out with the same sample as that used in Example, and then without carrying out the oxidation step, the same melting step as in Example 1 was carried out. The content did not completely melt, and a residue in a powder form in which unknown carbon powder and unmelted fluxes were intermingled was collected in a large amount. Therefore, it is understood that the oxidation step is essential when recovery of valuable materials from waste batteries is carried out at a temperature of about 1500° C., which is a preferred temperature range in real operation.

In Comparative Example 2, the same oxidation step as in Example was carried out for the same sample as that used in Example, without carrying out the roasting step, and then the melting step was carried out. As a result, the slag after the test contained unmelted portions, and the presence of carbon was recognized in the unmelted portions.

As such, in the present invention, in regard to an oxidation treatment of carbon which is a problem to be solved for stable recovery of valuable metals from waste batteries, it is understood that appropriate oxidation can be carried out by providing a roasting step and an oxidation step prior to the melting step.

The invention claimed is:

1. A method for recovering valuable metals from waste batteries, the method comprising:
   a roasting step for roasting the waste batteries at a temperature of higher than or equal to 300° C. and lower than 600° C.;
   an oxidation step for carrying out an oxidation treatment by roasting the waste batteries roasted in the roasting step at a temperature of from 1100° C. to 1200° C.; and
   dry step for melting the waste batteries after the oxidation step, and separately collecting slag and an alloy of valuable metals.

2. The method for recovering valuable metals according to claim 1, wherein the melting step in the dry step further comprises an additional oxidation step for carrying out an additional oxidation treatment.

3. The method for recovering valuable metals according to claim 2, wherein the roasting step and the oxidation step are carried out in a single heating furnace by sequentially changing the temperature inside the single heating furnace.

4. The method for recovering valuable metals according to claim 2, wherein the roasting step and the oxidation step are carried out in a single heating furnace by dividing an interior of the single heating furnace into plural zones, and heating the plural zones to different temperatures.

5. The method for recovering valuable metals according to claim 2, wherein the waste batteries are a battery pack equipped with a plastic casing.

6. The method for recovering valuable metals according to claim 1, wherein the roasting step and the oxidation step are carried out in a single heating furnace by sequentially changing the temperature inside the single heating furnace.

7. The method for recovering valuable metals according to claim 6, wherein the waste batteries are a battery pack equipped with a plastic casing.

8. The method for recovering valuable metals according to claim 1, wherein the roasting step and the oxidation step are carried out in a single heating furnace by dividing an interior of the single heating furnace into plural zones, and heating the plural zones to different temperatures.

9. The method for recovering valuable metals according to claim 8, wherein the waste batteries are a battery pack equipped with a plastic casing.

10. The method for recovering valuable metals according to claim 1, wherein the waste batteries are a battery pack equipped with a plastic casing.

* * * * *